May 18, 1937.	R. K. LEE	2,080,722
OSCILLATING JOINT
Original Filed March 26, 1930

INVENTOR.
ROGER K. LEE.
BY
ATTORNEYS.

Patented May 18, 1937

2,080,722

UNITED STATES PATENT OFFICE 2,080,722

OSCILLATING JOINT

Roger K. Lee, Highland Park, Mich., assignor to Chrysler Corporation, Detroit, Mich., a corporation of Delaware Original application March 26, 1930, Serial No. 439,177. Divided and this application July 27, 1933, Serial No. 682,359

2 Claims. (Cl. 29—84)

This invention relates to improved oscillating joints, particularly of the type used in spring suspensions and shock absorber riggings of motor vehicles, and is a division of my co-pending application Serial No. 439,177 filed March 26th, 1930.

Heretofore, in oscillating joints of the type which include inner and outer substantially rigid tubular members having a yieldable connecting sleeve, relatively high compression of the yieldable sleeve has been required to secure the rigid members against axial movement. Attempts have also been made to bond rubber sleeves to the adjacent surfaces of the rigid members by vulcanization after the joint is assembled.

In joints of the type in which the yieldable member is compressed to a degree sufficient to frictionally hold the rigid parts against axial movement, the relatively high compression required renders the joint substantially rigid and unsuited for use where sensitivity of action is essential. It has also been found that vulcanization of the rubber connecting member to the surface of the rigid members after the joint is assembled relaxes the compression of the rubber, thereby making the joint extremely loose and permitting excessive movement.

The main objects of this invention are to provide an improved method for securing the metal sleeves of oscillating joints against relative movement without interfering with the required compression of the yieldable connecting member thereof; to provide an improved joint having a rubber member rigidly bonded by vulcanization to an inner sleeve and frictionally held against movement relative to an outer sleeve by compression between the two sleeves; to provide a joint of this kind which has a yieldable member molded on the inner metal sleeve; and to provide a molded yieldable member in oscillating joints in which provision is made at spaced intervals throughout the length of the joint for accommodating the material of the member that is distorted laterally during compression so as to prevent excessive tensioning of the bond between the inner sleeve and yieldable member at the respectively opposite ends thereof.

An illustrative embodiment of this invention is shown in the accompanying drawing, in which.

Figure 1:
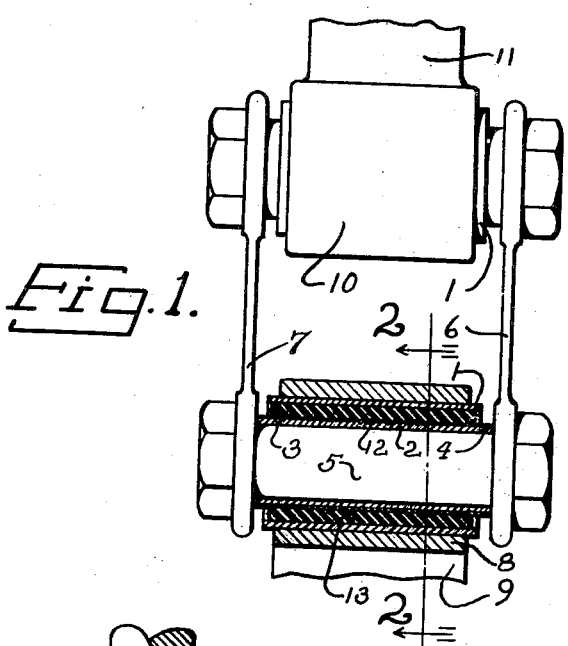
Fig. 1 is a side elevation of a spring shackle showing an improved oscillating joint in section.
Figure 2:
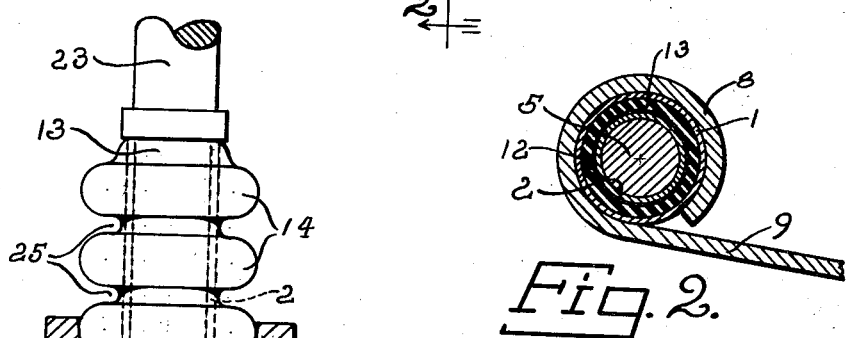
Fig. 2 is a transverse section taken on the line 2—2 of Fig. 1.
Figure 3:
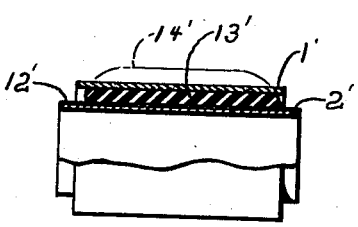
Fig. 3 is a vertical section showing a diagrammatic illustration of a device used in assembling the parts of my improved oscillating joint.

In the form shown in Figs. 1, 2, and 3, the oscillating joint is illustrated in connection with a spring shackle and includes an outer sleeve 1 and inner sleeve 2, the end portions 3 and 4 of which extend beyond the extremities of the outer sleeve 1. A bolt 5 passes through the inner sleeve 2 and firmly clamps the extremities of the inner sleeve between a pair of shackle bars 6 and 7. The outer sleeve 1 is firmly mounted on an eye 8 formed on the end of a main spring leaf 9. The upper ends of the shackle bars 6 and 7 are connected by a transversely extending oscillating joint which is substantially identical to the joint shown in section in Fig. 1, the outer sleeve 1 of the joint being firmly mounted in an eye 10 of a bracket or support 11 which is mounted on the chassis frame of a vehicle (not shown).

Formed on the outer periphery of the inner sleeve 2 is a film or coating of brass 12 on which a rubber sleeve 13 comprising integrally connected rings 14 is molded. The sleeve 13 is bonded by vulcanization to the brass coated outer surface of the inner sleeve 2 and its normal expanded diameter is substantially larger than the inner diameter of the outer sleeve 1 as illustrated in Fig. 3. When the parts of the joint are in the assembled relation shown in Fig. 1, the rubber sleeve is held under a substantial compression and the frictional engagement between the latter and the inner periphery of the outer sleeve 1 prevents relative axial movement between the outer sleeve and the intermediate yieldable sleeve.

Yieldable materials other than rubber and compositions containing rubber may be used to connect the inner and outer sleeves, and if desired the intermediate yieldable member may be secured to the outer periphery of the inner sleeve by cement or any suitable means.

Figure 4:
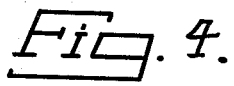
Fig. 4 is a fragmentary longitudinal section of an oscillating joint embodying a modified form of my invention.

In the form shown in Fig. 4, the oscillating joint includes inner and outer sleeves 1' and 2' which are yieldably connected together by an intermediate sleeve 13' comprising rubber or other suitable material which is initially of the shape illustrated by dotted lines 14. The intermediate sleeve 13' is preferably molded on the inner sleeve 2' and rigidly bonded by vulcanization or any other suitable manner to the outer periphery of the inner sleeve 2' and is held under a substantial compression by the outer sleeve 1'. A vulcanized bond may be conveniently formed be-